(12) United States Patent
Suzuki et al.

(10) Patent No.: US 8,035,267 B2
(45) Date of Patent: Oct. 11, 2011

(54) MOTOR WITH SHEET-LIKE COIL

(75) Inventors: Yuzuru Suzuki, Nagano (JP); Yuuki Takahashi, Nagano (JP); Miyuki Furuya, Nagano (JP)

(73) Assignee: Minebea Co., Ltd., Nagano (JP)

( * ) Notice: Subject to any disclaimer, the term of this patent is extended or adjusted under 35 U.S.C. 154(b) by 204 days.

(21) Appl. No.: 12/455,889

(22) Filed: Jun. 9, 2009

(65) Prior Publication Data
US 2010/0007230 A1     Jan. 14, 2010

(30) Foreign Application Priority Data

Jul. 10, 2008  (JP) ................................. 2008-180400
Nov. 26, 2008  (JP) ................................. 2008-300538

(51) Int. Cl.
*H02K 3/26* (2006.01)
(52) U.S. Cl. ........................................................ 310/208
(58) Field of Classification Search ................ 310/67 R, 310/90, 90.5, 206–208; 335/222, 299; 336/200, 336/206, 225, 232, 234; 360/98.07, 99.04, 360/99.08
See application file for complete search history.

(56) References Cited

U.S. PATENT DOCUMENTS

| 3,858,308 | A  | * | 1/1975 | Peterson ........................ 29/598 |
| 4,340,833 | A  | * | 7/1982 | Sudo et al. .................... 310/268 |
| 5,541,898 | A  | * | 7/1996 | Kasuga et al. ............. 369/44.14 |
| 6,215,219 | B1 | * | 4/2001 | Hwang ........................ 310/90.5 |
| 6,545,378 | B2 | * | 4/2003 | Chen et al. .................. 310/67 R |

FOREIGN PATENT DOCUMENTS

| JP | 08-222425  | 8/1996 |
| JP | 2002-027720 | 1/2002 |

* cited by examiner

*Primary Examiner* — Tran Nguyen
(74) *Attorney, Agent, or Firm* — Carrier Blackman & Associates, P.C.; Joseph P. Carrier; William D. Blackman

(57) ABSTRACT

A spindle motor includes: a stator yoke having a circular cylinder shape; a rotor magnet disposed opposite to the stator yoke with an air gap therebetween; a sheet-like coil disposed at a surface of the stator yoke opposing the rotor magnet; and a bearing structure, wherein the sheet-like coil includes a plurality of individual coils having a spiral-shape and arrayed in a circumferential direction, and a pattern made of a same material as the individual coils and disposed between two adjacent individual coils.

18 Claims, 14 Drawing Sheets

MOTOR WITH SHEET-LIKE COIL

FIELD OF THE INVENTION

The present invention relates to a slotless brushless spindle motor, and more particularly to a spindle motor employed in a magnetic disk apparatus for driving a magnetic disk.

BACKGROUND OF THE INVENTION

Conventionally, a slot type spindle motor, in which a yoke (stator yoke) provided with salient poles is used in a stator and which has excellent magnetic efficiency, is generally employed in magnetic disk apparatuses. However, with increasing magnetic recording density, the slot type spindle motor tends to suffer from cogging which is generated by the presence of the salient poles and which causes an undesirable vibration. To prevent such a cogging, a slotless spindle motor is disclosed in which a sheet-like coil is fixedly attached at the outer circumferential surface of a stator yoke which is free from salient poles (refer to, for example, Japanese Patent Application Laid-Open No. 2002-27720).

FIG. 13 is a perspective view of a slotless spindle motor 71 disclosed in Japanese Patent Application Laid-Open No. 2002-27720. The spindle motor 71 is a so-called radial gap type motor and includes a back yoke (stator yoke) 73 which is made of a magnetic material and formed into a circular cylinder, a coil sheet (sheet-like coil) 74 which is tightly fixed to the outer cylindrical surface (outer circumferential surface) of the back yoke 73, a magnet (rotor magnet) 75 which is formed into a circular cylinder and magnetized with a plurality of magnetic poles arranged in the circumferential direction, and a yoke (hub) 76 which retains the magnet 75 and at the same time functions as a turntable. The back yoke 73 and the magnet 75 are disposed concentrically to a rotary shaft 77 and a bearing 78, wherein a predetermined space (gap) is maintained between the back yoke 73 and the magnet 75.

The coil sheet 74 is structured such that a copper foil is formed by an etching or transferring method on a thin base film made of a soft and flexible material, for example, polyester or polyimide whereby a plurality of planar coils are built on the thin base film, and that a thin cover film is formed over the coils to prevent peeling-off and short circuit.

Since the coil sheet 74 is disposed in the magnetic field formed by the magnet 75 and the back yoke 73, when current is caused to flow in the planar coils formed in the coil sheet 74, an electromagnetic force is generated to act on each of the planar coils by Fleming's left-hand rule in the rotation direction. Due to the reaction of the electromagnetic force acting on each planar coil, the magnet 75 and the yoke 76 are rotated, wherein the magnetic field is uniformly distributed because the back yoke 73 has an even outer circumferential surface (no salient poles). Consequently, the motor is adapted to rotate smoothly without cogging.

In the slotless spindle motor 71 with the coil sheet 74, however, it is hard to enhance the magnetic density in the space between the coil sheet 74 and the magnet 75 compared with in the slot type spindle motor. Therefore it is hard to increase torque in the slotless spindle motor 71. To overcome the above problem with the slotless spindle motor 71, the number of coil turns must be increased to achieve an increased torque. However, in a typical sheet coil which is made such that a single-layered coil is formed on a flexible substrate by printing or etching, it is difficult to increase the number of coil turns, which means it is difficult to achieve a high-density conductor circuit with coil having a high wiring occupation ratio.

With respect to the foregoing, for example, an FP coil (fine pattern coil by Asahi Kasei Electronics Co., Ltd.) is known, which is a sheet coil adapted to realize a high aspect-ratio electric conductor (thick film conductor) as well as a short distance between adjacent coil turns of the conductor and therefore achieves a high-density multi-layered thick film conductor circuit. Further, a motor to use the FP coil as planar coils is proposed for achieving a high torque (refer to, for example, Japanese Patent Application Laid-Open No. H8-222425).

FIGS. 14A and 14B show a motor 91 disclosed in Japanese Patent Application Laid-Open No. H8-222425, wherein FIG. 14A is an axial cross sectional view of the motor 91 and FIG. 14B is a plan view of a planar coil. The motor 91 is a so-called axial gap type motor and includes a yoke base plate 92 made of a metal plate and the like, a thick film fine pattern coil 93 fixed on the yoke base plate 92, and a magnet 97 rotatably disposed to oppose the thick film fine pattern coil 93.

The thick film fine pattern coil 93 includes a plurality of triangular coil conductors 94 disposed equiangularly on the same plane with a predetermined interval, a plurality of terminals 95 and a plurality of wiring lines 96 connecting between the coil conductors 94 and the terminals 95. The thick film conductors have a cross section of a substantially rectangular shape with a height of 150-320 μm, wherein a minimum cyclic pitch between adjacent conductor turns ranges from 100 to 200 μm.

However, it turns out that when such a thick film fine pattern coil is used in a radial gap type spindle motor which is expected to generate a larger torque than the above described axial gap type spindle motor, there occurs a problem that when the strip-shaped thick film fine pattern coil, which includes a plurality of rectangular individual coils arrayed in a straight line, is bound around the outer cylindrical circumference of a back yoke, the thick film fine pattern coil does not make a tight contact with the entire circumferential surface of the back yoke thus resulting in unintentionally and undesirably generating gaps partly therebetween. This is because the thick film fine pattern coil, when rolled up, undergoes an inhomogeneous deformation, for example, may be bent between every adjacent individual coils thus failing to be rolled up in a good shape entirely with a uniform curvature. If the whole surface of the thick film fine pattern coil is not brought into a tight contact with the back yoke, it is hard to narrow an air gap between the back yoke and the magnet, and therefore a magnetic flux density enhancement which is supposed to result from narrowing of the air gap is inhibited. Also, torque ripple is generated, and consequently it is very hard to achieve a stabilized rotation performance.

Also, depending on the degree of deformation, the thick film fine pattern coil is possibly cracked at portions each located between two adjacent individual coils, in which case the thick film conductor may be broken or rusted. Further, gas or dust may leak from the cracked portions.

The problem that the thick film fine pattern coil, when rolled up, is deformed and eventually cracked at the portions between two adjacent individual coils as described above is attributed to the difference in stiffness between the metal material (thick film conductor), such as copper, for forming the individual coils and the resin material (insulation layer between conductors) present between the adjacent individual coils.

On the other hand, the thick film fine pattern coil entirely has relatively large stiffness, so that when the thick film fine pattern coil is rolled up to sit tightly on the outer cylindrical surface of the back yoke (especially if its diameter is small), both ends of the thick film fine pattern coil are possibly caused to spring back. Consequently, the thick film fine pattern coil may be peeled off from the back yoke.

SUMMARY OF THE INVENTION

The present invention has been made in the light of the problems described above, and it is a primary object of the present invention to provide a radial gap type slotless motor, in which if a fine pattern coil (FP coil) is used as a sheet-like coil, the portions each located between two adjacent individual coils in the film pattern coil are free from cracks, the entire sheet-like coil is fixed tightly to the back yoke, and therefore a stable rotation performance is achieved.

In order to achieve the object described above, according to a first aspect of the present invention, there is provided a motor which includes: a stator yoke having a cylindrical shape; a rotor magnet disposed so as to oppose the stator yoke with an air gap therebetween; a bearing structure; and a sheet-like coil disposed at a surface of the stator yoke opposing the rotor magnet, wherein the sheet-like coil includes a plurality of individual coils having a spiral shape and arrayed in the circumferential surface, and a pattern made of the same material as the individual coils and disposed between two adjacent individual coils.

In the first aspect of the present invention, each of the patterns may include a line segment extending in the circumferential direction.

In the first aspect of the present invention, each of the patterns may include a wiring line.

In the first aspect of the present invention, at least one of the patterns may include a dummy wiring line which is not connected electrically to the individual coils.

In the first aspect of the present invention, the sheet-like coil may further include: a wiring line which extends in the circumferential direction and is disposed along at least one portion of each axial end of the sheet-like coil; and at least one dummy wiring line which is not electrically connected to the individual coils and disposed at portions of either or both axial end areas of the sheet-like coil in which the wiring line extending in the circumferential direction is not disposed.

In the first aspect of the present invention, the sheet-like coil may include circumferential end portions, respectively, at opposite ends of the sheet-like coil, the stator yoke may include a slit which is formed in the surface of the stator yoke opposing the rotor magnet and which extends in the axial direction, and both of the circumferential end portions of the sheet-like coil may be inserted in the slit.

In the first aspect of the present invention, the individual coils may be each made of a plurality of thick film conductors radially layered on one another, the aspect ratio of a thick film conductor of a radially inward layer may be smaller than the aspect ratio of a thick film conductor of a radially outward layer, and the number of coil turns of a thick film conductor of an inward layer may be less than the number of coil turns of a thick film conductor of an outward layer.

In the first aspect of the present invention, each of axial end surfaces of the sheet-like coil may be coated with a thin film.

In the first aspect of the present invention, the bearing structure may include a fluid dynamic pressure bearing, and the bearing structure may include a radial bearing for supporting a shaft in the radial direction and a thrust bearing for supporting the shaft in the thrust direction where the radial bearing is a fluid dynamic pressure bearing and the thrust bearing is a magnetic bearing.

In the first aspect of the present invention, the stator yoke and a part of the bearing structure may be made of a dust core and integrated with each other.

In the first aspect of the present invention, the rotor magnet may be made of a rare earth sintered magnet with radial magnetization and may have multiple poles arrayed in the circumferential direction.

In the first aspect of the present invention, the motor may be a spindle motor.

According to a second aspect of the present invention, there is provided a coil sheet which includes: a plurality of individual coils having a spiral shape and arrayed along the length direction of the coil sheet; and at least one pattern made of the same material as the individual coils and disposed between two adjacent individual coils.

In the second aspect of the present invention, the individual coils may be each made of a plurality of thick film conductors layered on one another in the thickness direction of the coil sheet, and the aspect ratio of a thick film conductor of one layer may be different from the aspect ratio of a thick film conductor of another layer.

In the second aspect of the present invention, the individual coils may be each made of a plurality of thick film conductors layered in a thickness direction of the coil sheet on one another in a multilayer manner, and the number of coil turns at a thick film conductor of one layer may be different from the number of coil turns at a thick film conductor of another layer.

According to the present invention, there is provided a radial gap type slotless motor, in which if a fine pattern coil (FP coil) is used as a sheet-like coil, the portions each located between two adjacent individual coils in the film pattern coil are free from cracks, the entire sheet-like coil is fixed tightly to the back yoke, and therefore a stable rotation performance is achieved.

Also, there is provided a coil sheet in which the portions each located between two adjacent individual coils are free from cracks.

DETAILED DESCRIPTION OF THE INVENTION

Exemplary embodiments of the present invention will hereinafter be described referring to the accompanying drawings.

Figure 1:
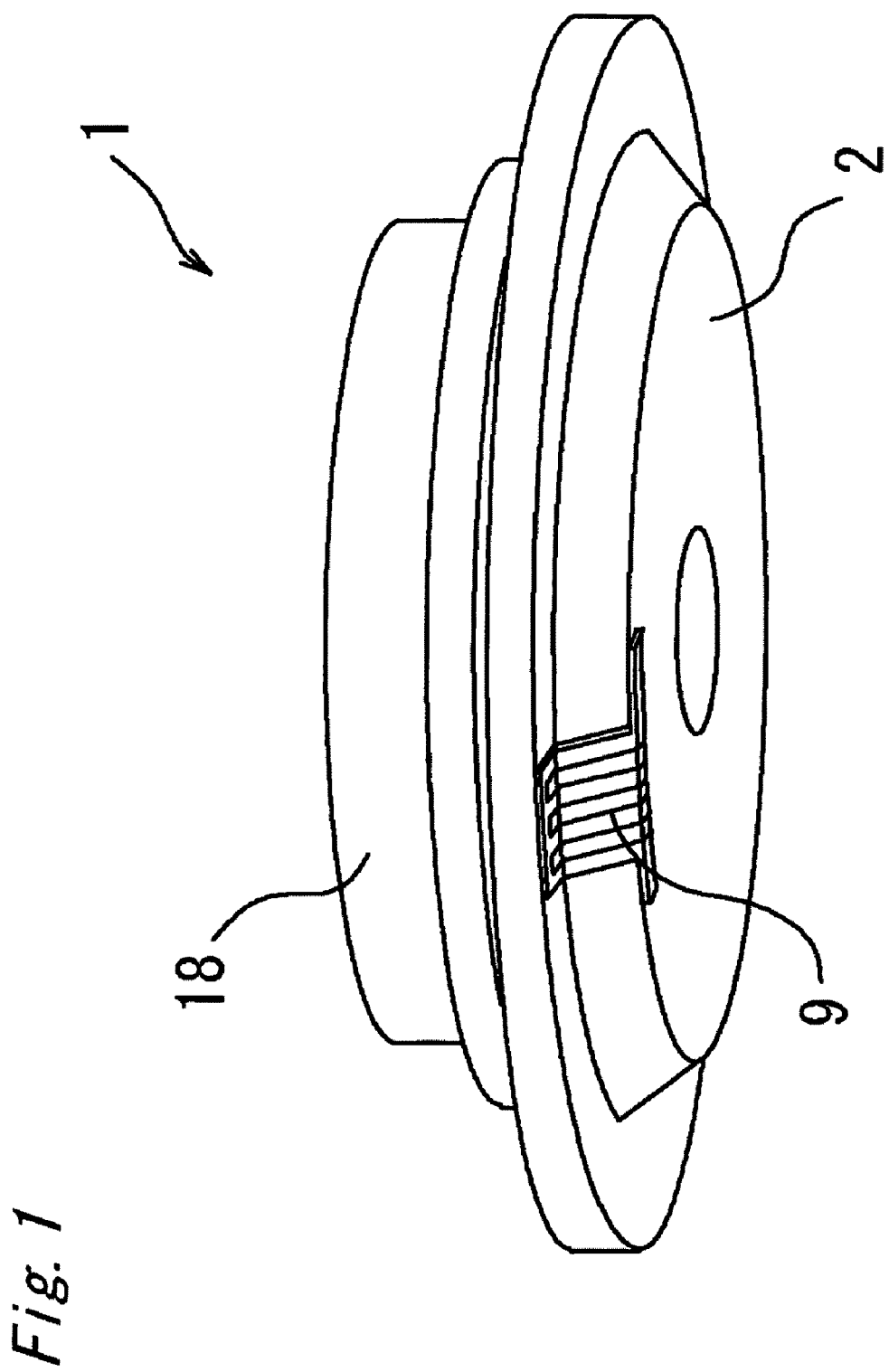
FIG. 1 is a perspective view of a spindle motor according to a first embodiment of the present invention.
Figure 2:
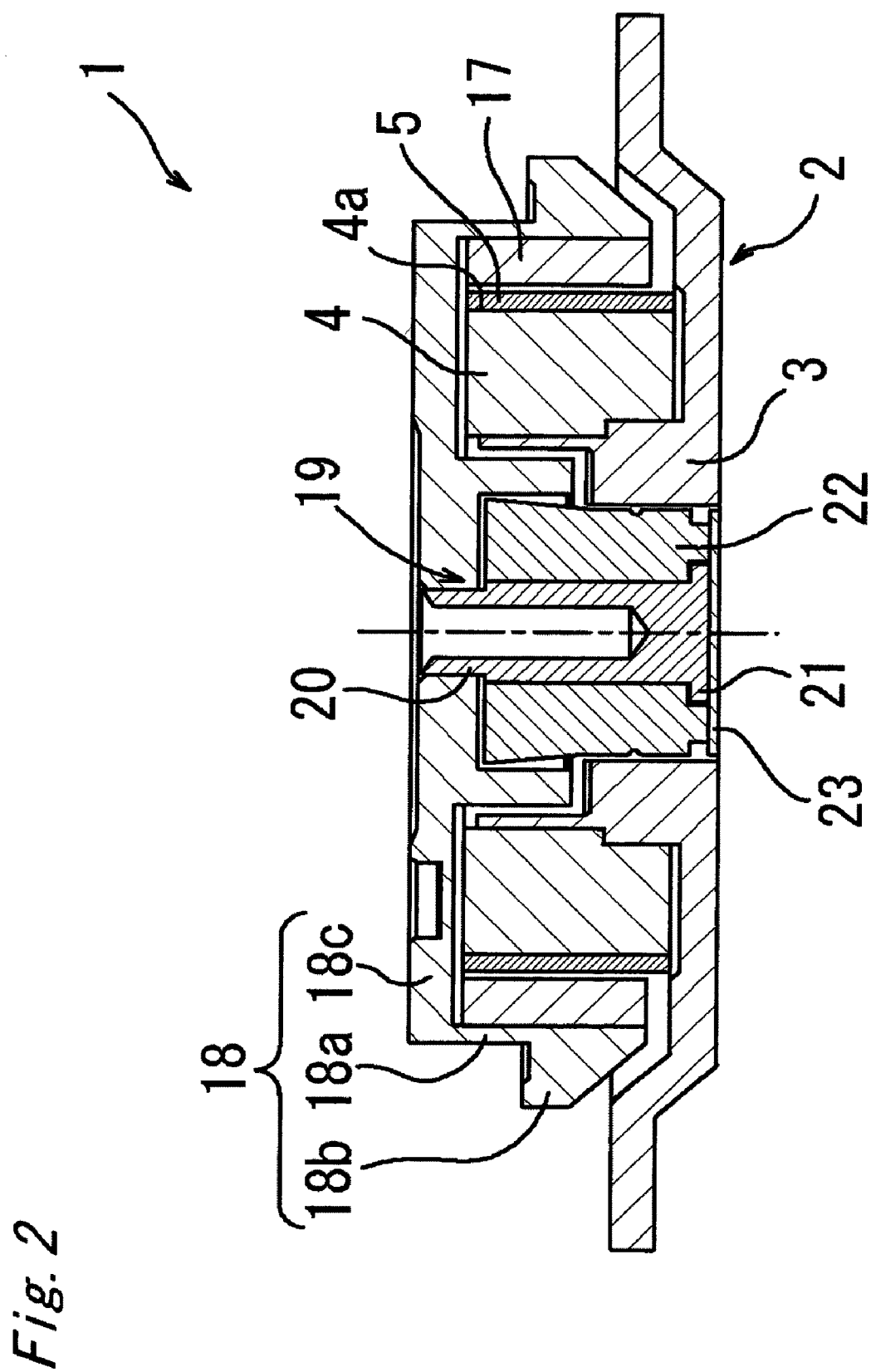
FIG. 2 is an axial cross sectional view of the spindle motor of FIG. 1.

A first embodiment of the present invention will be described with reference to FIGS. 1 and 2. Referring to FIGS. 1 and 2, a spindle motor 1 is a radial gap type slotless spindle motor, in which a dish-like housing 2 is disposed at the lower side in the figures, a hollow circular cylindrical boss 3 formed integrally with the housing 2 by aluminum die casting is disposed substantially vertically at the center part of the housing 2 so as to extend toward the upper side in the figures, and in which a terminal 7 (not shown in FIG. 2) to supply electric power to a sheet-like coil 5 (to be described later) is disposed at the lower surface (bottom surface) of the housing 2.

A hollow circular cylindrical stator yoke 4 having no salient poles is fixedly attached at the outer circumference of the boss 3. The stator yoke 4 is made of a soft magnetic steel plate (an electromagnetic steel plate, for example, a cold-rolled steel plate (SPC), an electro galvanized steel plate (SEC), or a silicon steel plate). In consideration of the eddy current loss, the stator yoke 4 is composed of a plurality of steel plates layered on one another.

The aforementioned sheet-like coil 5 has a strip shape, constitutes a stator in association with the stator yoke 4 and is fixed by an adhesive agent to an outer circumferential surface 4a (surface opposing a rotor magnet 17 to be described later), that is the outer cylindrical surface, of the stator yoke 4. The sheet-like coil 5 is, for example, an FP coil (fine pattern coil by Asahi Kasei Electronics Co., Ltd.) and the detail thereof will be described later herein. While the sheet-like coil 5 can be fixed to the stator yoke 4 using an adhesive tape or the like instead of an adhesive agent, the fixing layer thickness can be reduced when an adhesive agent is used, in which case the space between the stator yoke 4 and the rotor magnet 17 to be described later can be narrowed, and the magnetic efficiency therebetween is enhanced.

The rotor magnet 17 has a hollow circular cylindrical shape and is disposed around the sheet-like coil 5 such that the inner circumference surface of the rotor magnet 17 faces the outer circumferential surface of the sheet-like coil 5 with a predetermined air gap provided therebetween. That is to say, the rotor magnet 17 is disposed to surround the stator yoke 4 such that the sheet-like coil 5 and the aforementioned predetermined air gap are sandwiched between the rotor magnet 17 and the stator yoke 4. The rotor magnet 17 is a rare earth sintered magnet, to which radial magnetization is applied circumferentially thereby forming twelve magnetic poles. The outer circumferential surface of the rotor magnet 17 is fixedly attached to a hub 18. In this connection, a different kind of magnet, for example, a rare earth bonded magnet and a radial anisotropic magnet, may be used for the rotor magnet 17. However, in order to obtain a high torque, the rotor magnet 17 is preferably the aforementioned rare earth sintered magnet which can produce a high magnetic flux density. Further, for the purpose of obtaining an increased torque, it is advisable to minimize the air gap between the rotor magnet 17 and the sheet-like coil 5.

The spindle motor 1 is a so-called sensorless motor in which a location detection sensor, for example, a Hall element is not used, wherein the induced voltage produced by the change of the magnetic flux at the sheet-like coil 5 is utilized thereby detecting the rotational position of the rotor magnet 17. Consequently, the magnetic flux is not caused to change when the spindle motor 1 is out of operation, and therefore a predetermined current must be applied to the sheet-like coil 5 thereby activating the rotor magnet 17 in order to change the magnetic flux. However, the rotor magnet 17 may start rotating in the reverse direction depending on where the magnetic poles of the rotor magnet 17 are positioned. If the reverse direction rotation covers a wide range, a magnetic head may have troubles.

In this connection, because the sheet-like coil 5 is used in the spindle motor 1, it is easy to increase the number of coils (individual coils 10 to be described later) compared with a motor in which coils are each wound on the salient pole. Since the number of coils is allowed to be increased, the number of magnetic poles which is proportional to the number of coils also can be increased, and therefore the range of the reverse direction rotation can be reduced. So, in the present embodiment, the number of magnetic poles is set to twelve, and the range of the reverse direction rotation is set to 15 degrees. But the present invention is not limited to the above described arrangements about the number of magnetic poles and the degree of rotation range.

The hub 18 for retaining the rotor magnet 17 is made of a soft magnetic material and functions as a back yoke of the rotor magnet 17. The hub 18 includes a hollow circular cylinder portion 18a, a flange portion 18b formed at the outer circumferential surface of the circular cylinder portion 18a, and a circular disk-like upper lid portion 18c covering the top end of the circular cylinder portion 18a.

The rotor magnet 17 is fixed tightly at the inner circumferential surface of the cylinder portion 18a. A magnetic disk (not shown) is disposed on the flange portion 18b. And a fluid dynamic bearing structure 19 is fitted into the center part of the upper lid portion 18c (located at the center part of the rotor magnet 17), wherein the hub 18 to hold the rotor magnet 17 is rotatably supported with respect to the stator yoke 4. In this connection, the spindle motor 1 may alternatively be composed such that the hub 18 is made of a non-magnetic material, a circular cylinder member made of a soft magnetic material is disposed at the inner circumferential surface of the hub 18, and further that the rotor magnet 17 is fixed to the inner circumferential surface of the cylinder member.

The fluid dynamic bearing structure 19 includes a bar-shaped shaft 20 which is rotatably disposed at the rotation center and supports the hub 18, a flange 21 having a disk-shape and disposed at the lower end of the shaft 20, a sleeve 22 having a circular cylinder shape and disposed around the shaft 20, and an end cap 23 having a circular-disk shape and covering the lower end of the flange 21, wherein the sleeve 22 is fitted into the hollow of the boss 3 and thereby structured integrally with the housing 2, and wherein the end cap 23 is engagingly brought into contact with the lower end of the sleeve 22 and thereby structured integrally therewith.

A plurality of grooves (not shown) to generate a radial dynamic pressure are formed at the inner circumferential surface of the sleeve 22. Also, a plurality of grooves (not shown) to generate an axial dynamic pressure are formed at the lower end surface of the flange 21. And, lubricant is filled in the sleeve 22. With the structure described above, a radial bearing to support the shaft 20 in the radial direction is formed between the shaft 20 and the inner circumferential surface of the sleeve 22, and also a thrust bearing to support the shaft 20 in the thrust direction is formed between the lower end surface of the flange 21 and the end cap 23.

Figure 3:
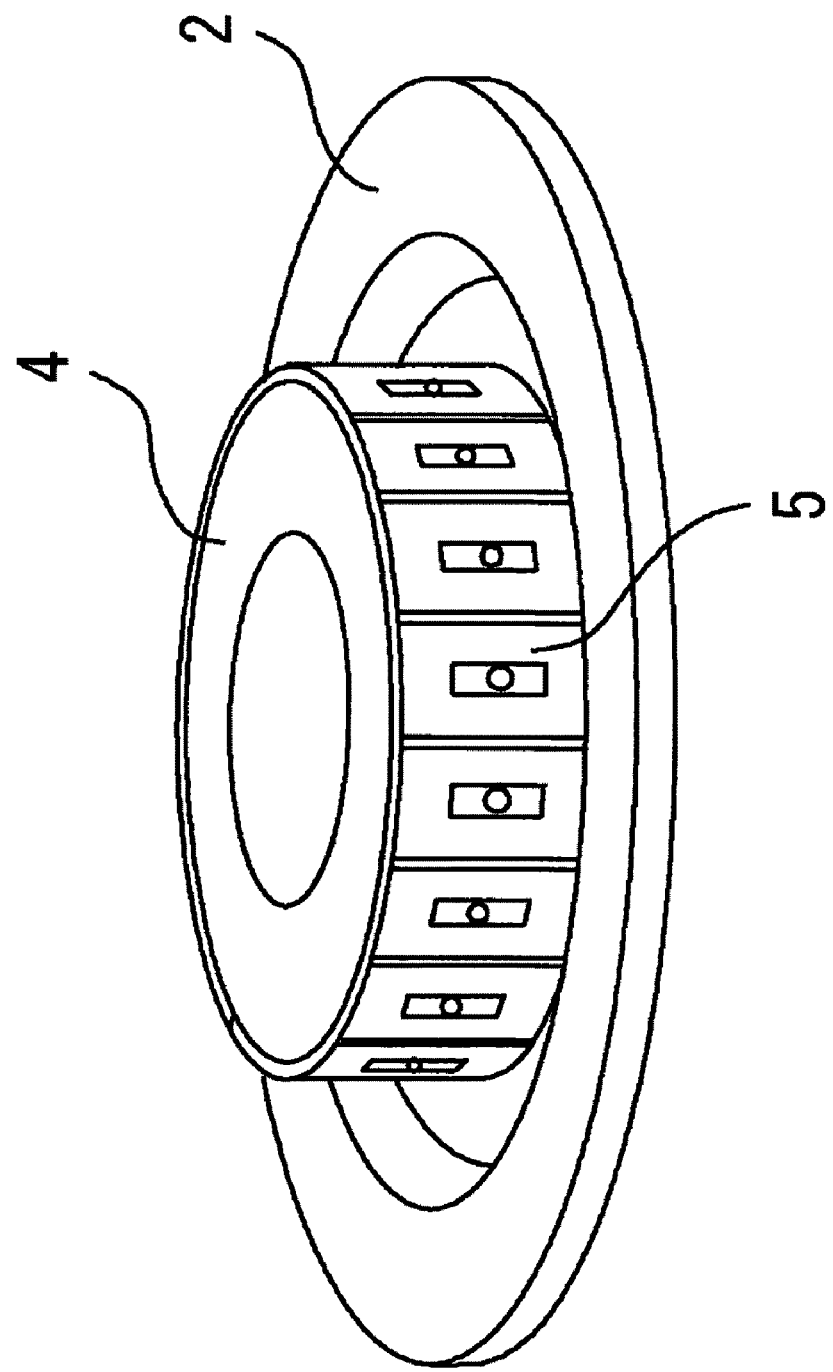
FIG. 3 is a perspective view of a relevant part of the spindle motor of FIG. 1.
Figure 4:
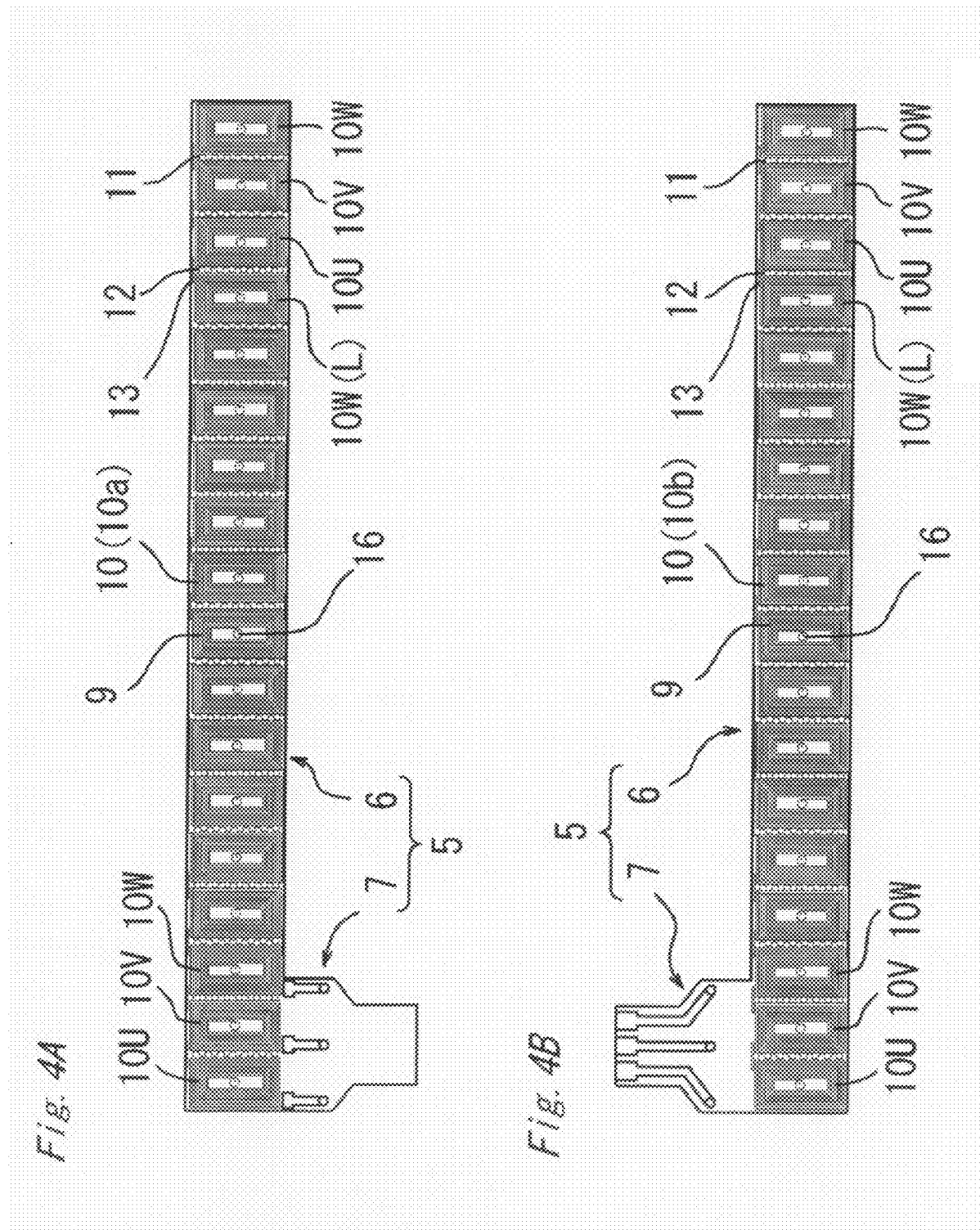
FIGS. 4A and 4B are development plan views of a sheet-like coil for the spindle motor of FIG. 1 respectively showing front and rear surfaces thereof.
Figure 5:
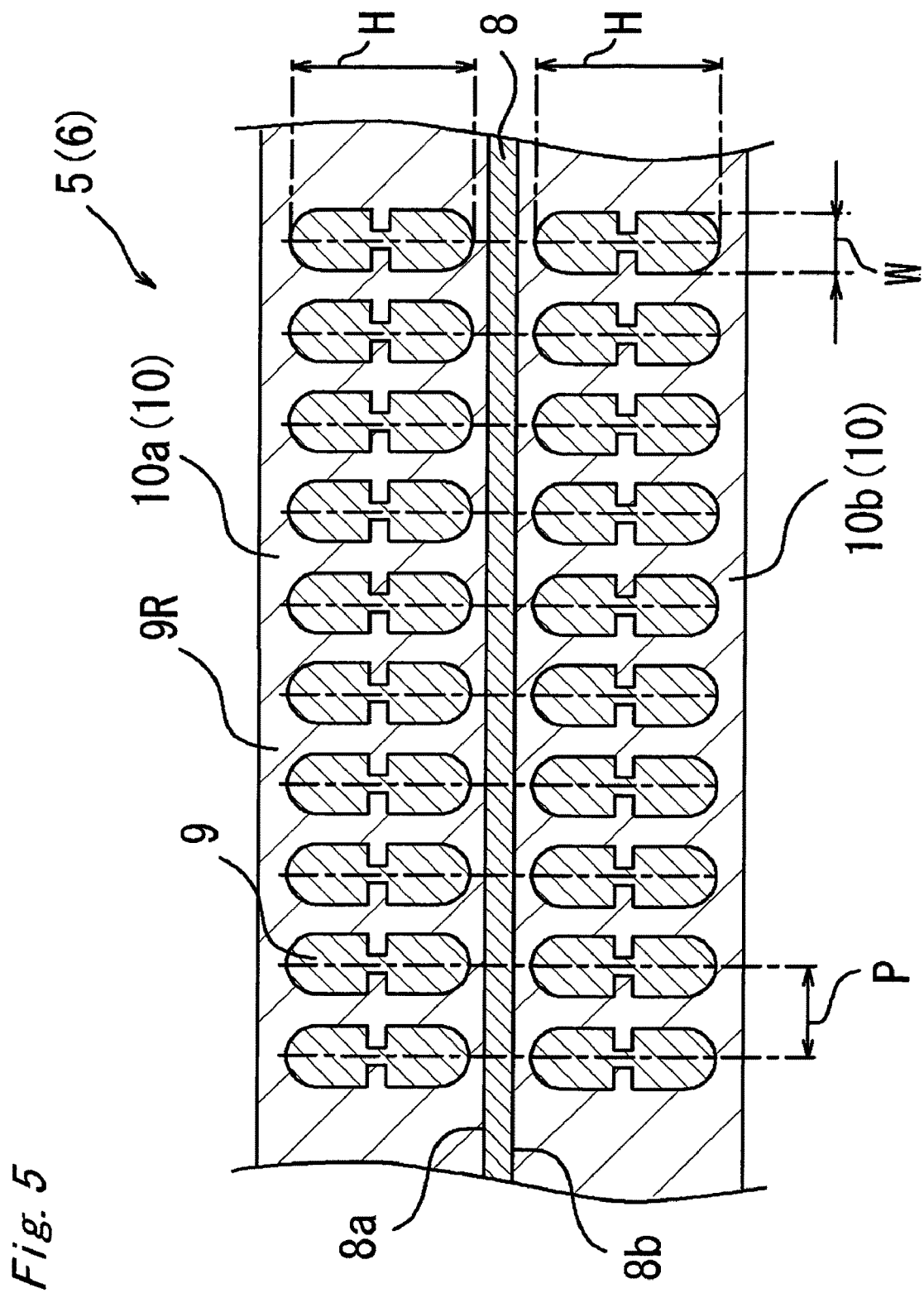
FIG. 5 is an enlarged view of a part of a thickness cross section of the sheet-like coil of FIG. 4A.
Figure 6:
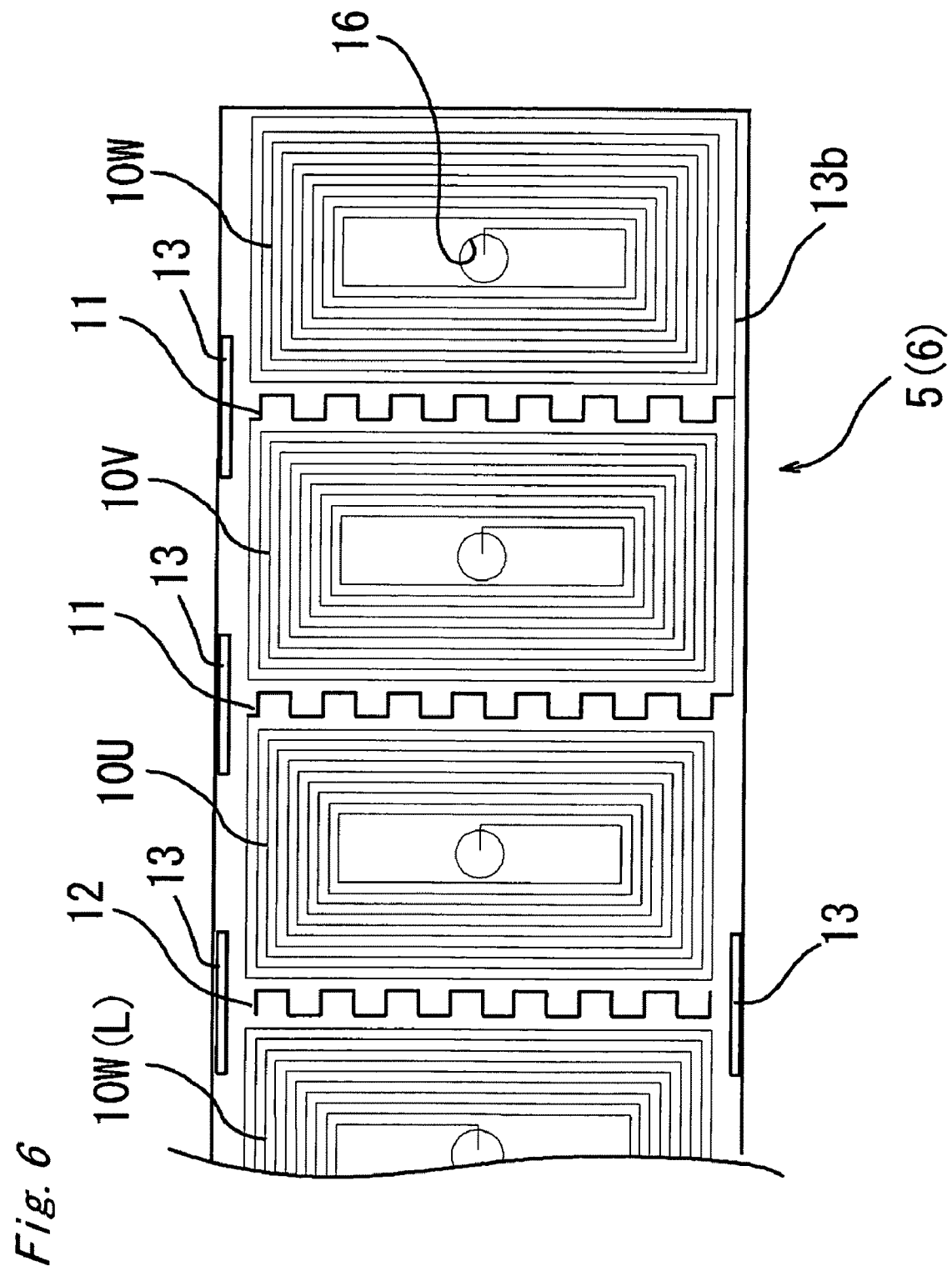
FIG. 6 is an enlarged view of a part of the sheet-like coil of FIG. 4A.

The sheet-like coil 5 (FP coil) which is featured in the present invention will now be described in detail referring to the FIGS. 3 to 6. FIG. 3 is a perspective view of the sheet-like coil 5 (including the housing 2) fixedly attached to the outer circumferential surface 4a of the stator yoke 4 having a circular cylinder shape. FIGS. 4A and 4B are development plan views of the sheet-like coil 5, wherein FIG. 4A shows the front surface (outer surface opposing the rotor magnet 17 when rolled up and assembled) of the sheet-like coil 5 and FIG. 4B shows the rear surface (inner surface adhered to the stator yoke 4 when rolled and assembled) of the sheet-like coil 5. FIG. 5 is an enlarged view of a profile cross section of a part of an individual coil 10 (to be described later) of the sheet-like coil 5 developed, and FIG. 6 is an enlarged view of a part (right end portion) of the sheet-like coil 5 shown in FIGS. 4A and 4B developed.

According to the present embodiment, the sheet-like coil 5 has a double-layered structure in which a thick film conductor circuit is formed on each of the surfaces of an insulative core sheet. As shown in FIGS. 4A and 4B, the sheet-like coil 5 includes a body portion 6 having a strip-shape and the terminal 7 extending from one axial end of the body portion 6. The terminal 7 receives an electric signal from a driving circuit (not shown) disposed outside and supplies the electric signal to the body portion 6.

The circumferential direction (longer direction) length of the body portion 6 is set substantially equal to the circumferential length of the stator yoke 4, and the axial direction (shorter direction) length of the body portion 6 is set substantially equal to the axial direction length of the stator yoke 4. Referring to FIG. 5, the body portion 6 is structured such that the above mentioned thick film conductor circuit, which is formed on each of the surfaces (front surface 8a and rear surface 8b) of the insulative core sheet 8 disposed at the center part of the thickness direction of the body portion 6, includes a thick film conductor 9 made of metal, and an insulative resin layer 9R covering the thick film conductor 9. As shown in FIGS. 4A and 4B, the thick film conductor 9 includes the above mentioned plurality of individual coils 10 having a rectangular-spiral patterned shape and wiring lines connecting the plurality of individual coils 10. Further, in the body portion 6, a plurality of through holes 16 are formed so as to penetrate the insulative core sheet 8 in its thickness direction and therefore the thick film conductors 9 formed respectively at the front surface 8a and the rear surface 8b can be connected electrically to each other.

The plurality (eighteen pairs in the present embodiment) of individual coils 10 are formed at the body portion 6 along the circumferential direction thereof and are connected so as to each form one of U-phase, V-phase and W-phase. If it is needed to identify the phase difference, the individual coils 10 will be referred to distinctly as U-phase individual coil 10U, V-phase individual coil 10V and W-phase individual coil 10W corresponding to U-phase, V-phase and W-phase, respectively. Further, if it is needed to distinguish the individual coil 10 formed on the front surface 8a from the individual coil 10 formed on the rear surface 8b, the individual coil 10 on the front surface 8a is referred to specifically as front individual coil 10a, and the individual coil 10 on the rear surface 8b is referred to specifically as rear individual coil 10b. If the front individual coil 10a and the rear individual coil 10b are structured identically with each other, then the front individual coil 10a is called generically as individual coil 10.

The front individual coil 10a and the rear individual coil 10b according to the present embodiment are structured identically (or substantially identically) with each other. Specifically, the number of turn segments of the thick film conductor 9 (the number seen in cross section and corresponding to the number of turns of the individual coil 10), a pitch P between two adjacent turn segments, and an aspect ratio (a ratio of a conductor height H to a conductor width W) H/W are identical (or substantially identical) between the front and rear individual coils 10a and 10b as shown in FIG. 5. In cross section of the figure, the turn segments of the thick film conductor 9 have recesses at the center part with respect to the vertical direction. The recesses may be produced in the manufacturing method for the thick film conductors 9 and are not essential.

In the body portion 6 of the sheet-like coil 5, an axial wiring line (effective pattern) 11 is formed at some of boundary regions each located between two adjacent individual coils 10 (for example, in FIG. 6, at boundary regions located between the U-phase individual coil 10U and the V-phase individual coil 10V, and between the V-phase individual coil 10V and the W-phase individual coil 10W). The axial wiring line 11 is extended in the axial direction in a square meandering manner and electrically connected to at least one of the individual coils 10. More specifically, the axial wiring line 11 is made of the same material as the individual coil 10 and is composed such that an axial line segment and a circumferential line segment are alternately and sequentially connected to each other thereby extending in the axial direction as a whole. The circumferential line segment has a length of, for example, 150 μm, while there is an interval space of 200 μm between two adjacent individual coils 10.

On the other hand, a dummy axial wiring line (dummy pattern for reinforcement) 12 is provided at a boundary region (between two adjacent individual coils 10) at which the axial wiring line 11 is not required and therefore not provided (for example, at a boundary region located between the W-phase individual coil 10W (L) shown at the left end and the U-phase individual coil U10 in FIG. 6). The dummy wiring line 12 is made of the same material as the individual coils 10 but not electrically connected to the individual coil 10. The dummy wiring line 12 has the same shape as the individual coil 10, specifically is formed to squarely meander while extending in the axial direction as a whole.

In the present embodiment, while a circumferential wiring line 13b extending in the circumferential direction is formed at some of the areas close to and along both axial ends of the body portion 6 so as to pass by two adjacent individual coils 10, a dummy circumferential wiring line 13 which is not electrically connected to any of the individual coils 10 is arranged at an axial end area of the body portion 6 at which the circumferential wiring line 13b is not provided, wherein the dummy circumferential wiring line 13 bridges two adjacent individual coils 10. In the example shown in FIG. 6, the circumferential wiring line 13b is formed at the lower axial end area of the body portion 6 so as to bridge the V-phase individual coil 10V and the W-phase individual coil 10W. Accordingly, the circumferential wiring line 13 is formed at each of both the upper side and the lower side of the boundary region between the W-phase individual coil 10W(L) shown at the left and the U-phase individual coil 10U, at the upper side of the boundary region between the U-shape individual coil 10U and the V-phase individual coil 10V, and at the upper side of the boundary region between the V-shape individual coil 10V and the W-phase individual coil 10, where the circumferential wiring line 13b is not provided.

The dummy circumferential wiring line 13 is disposed at at least one (axial direction) end of the boundary region located between two adjacent individual coils 10 so as to extend linearly in the circumferential direction. In the present embodiment, the dummy circumferential wiring line 13 has a length equal to or larger than the interval distance at the boundary region between two adjacent individual coils 10.

The spindle motor 1 including the sheet-like coil 5 described above provides the following advantageous effects. Since the sheet-like 5 to be fixedly attached to the stator yoke 4 is constituted by the FP coil in which a high-density thick film conductor circuit is formed (that is, a high aspect-ratio conductor is arranged in a coil form with a small distance provided between two adjacent conductor turn segments), a high torque can be achieved. Also, the number of the individual coils 10 can be readily increased compared with the coil structure having a wire wound around the salient pole of a stator yoke.

Furthermore, according to the present embodiment, either the axial wiring line 11 or the dummy axial wiring line 12, both of which are made of the same material as the individual coil 10 of the body portion 6 of the sheet-like coil 5, is formed between two adjacent individual coils 10. Specifically, a thick film conductor (pattern) having a plurality of circumferentially extending line segments arrayed in the axial direction is disposed at each boundary region between two adjacent individual coils 10. Consequently, the difference in material stiffness between at the individual coils 10 and at the boundary region can be reduced for stiffness equalization compared with the structure in which the boundary region between two adjacent individual coils 10 is composed of resin alone while the individual coil 10 contains a metal material (for example, copper). As a result, the deformation (bending) or the crack can be suppressed, which is conventionally caused at the boundary region between two adjacent coils 10 when the sheet-like coil 5 is rolled up and attached to the outer circumferential surface 4a of the stator yoke 4. Also, the sheet-like coil 5 can be tightly attached to the entire area of the outer circumferential surface 4a of the stator yoke 4. Consequently, the spindle motor 1 adapted to rotate smoothly without cogging can be produced with a high workability, and at the same time the thick film conductor can be prevented from being damaged or corroded and the gas can stay contained.

Also, when the dummy circumferential wiring line 13 extending in the circumferential direction is additionally arranged at each void (no conductor) area at the both axial ends of the boundary region of the body portion 6 so as to bridge two adjacent individual coils 10, the difference in material stiffness between at the individual coil 10 and at the boundary region between two adjacent individual coils 10 can be further reduced for equalization. Accordingly, it is assured that the sheet-like coil 5 can be further fixedly and tightly attached on the outer circumferential surface 4a of the stator yoke 4.

Figure 7:
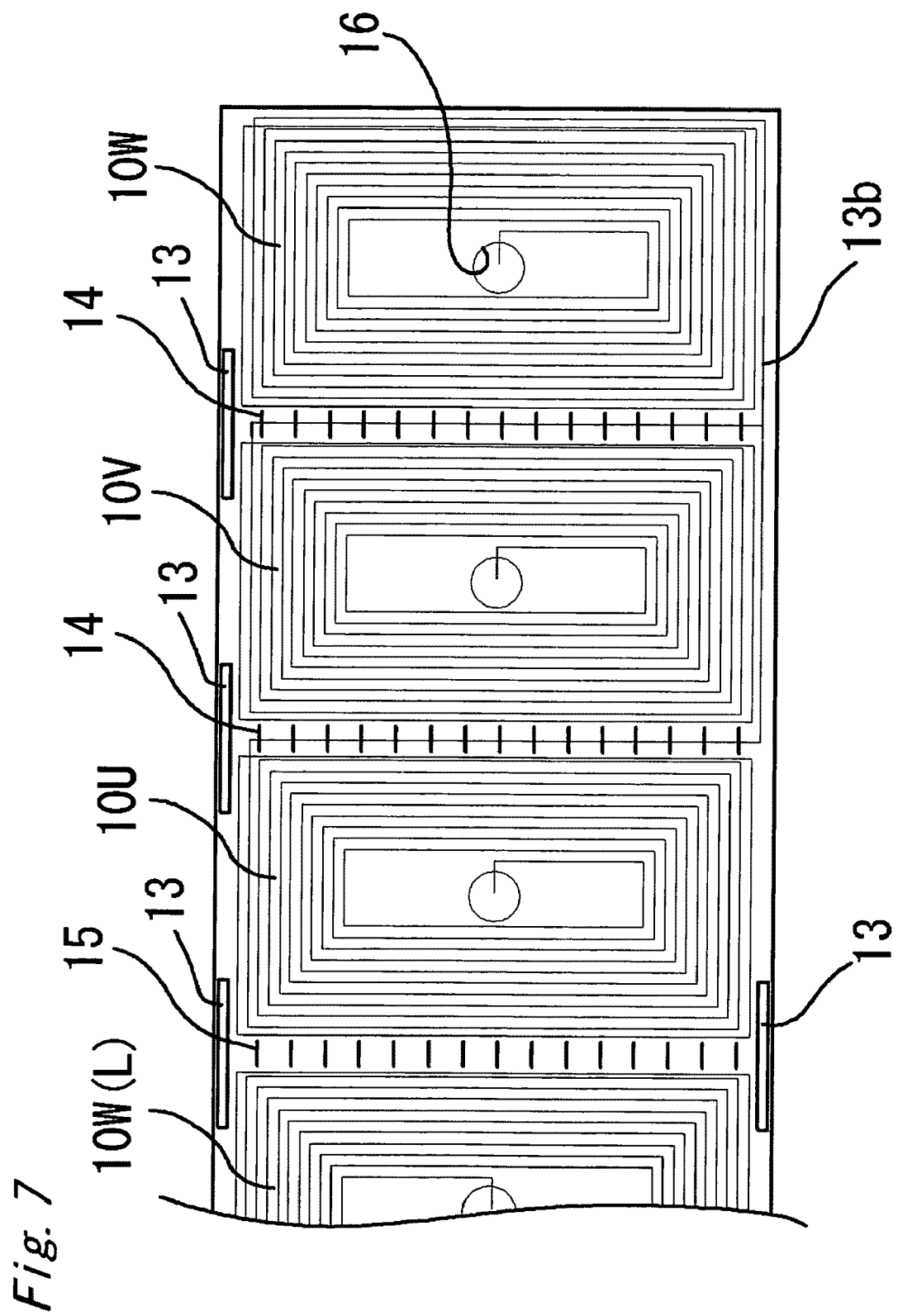
FIG. 7 is an enlarged view of a modification example of the sheet-like coil.

The axial wiring line does not necessarily have to be shaped to squarely meander like the axial wiring line 11. Alternatively, the axial wiring line may be structured, for example, such that a plurality of line segments (corresponding to branch lines) extending circumferentially are arrayed in the axial direction so as to cross a straight axial wiring line provided at the boundary region between two adjacent individual coils 10 thus forming an axial wiring line 14 as shown in FIG. 7. Also, the boundary region which is located between the W-phase individual coil 10W (L) and the U-phase individual coil 10U and in which a straight axial wiring line is not needed may be provided with a dummy axial wiring line 15 which includes only a plurality of line segments extending circumferentially and arrayed in the axial direction.

Also, the axial wiring line 11 and the dummy axial wiring line 12 may be formed to be zigzagging, instead of squarely meandering, wherein two kinds of line segments, which are not aligned to the axial nor circumferential direction but inclined in the respective directions opposite to each other, are arranged alternately and repeatedly in series. Further, the axial wiring line 11 and the dummy axial wiring line 12 may be formed to meander or wind in other geometries. If the axial wiring line 11 and the dummy wiring line 12 are formed to zigzag, the pattern constituted by the axial wiring line 11 and the dummy axial wiring line 12 contains a plurality of segment lines extending somewhat toward the circumferential direction.

The length of the circumferential line segment of the axial wiring line 11 and the dummy axial wiring line 12 or the number of the circumferential line segments of the axial wiring line 14 is set considering the curvature of the stator yoke 4, the structure of the individual coil 10, and the like. For example, the number of circumferential line segments may be increased to such an extent that the circumferential line segments are brought into contact with one another, whereby the pattern is formed substantially rectangular as a whole.

Accordingly, even if any of the patterns, described above is provided at the boundary region between two adjacent individual coils 10, the pattern contains line components extending in the circumferential direction, and therefore the advantageous effects described above can be achieved.

Figure 8:
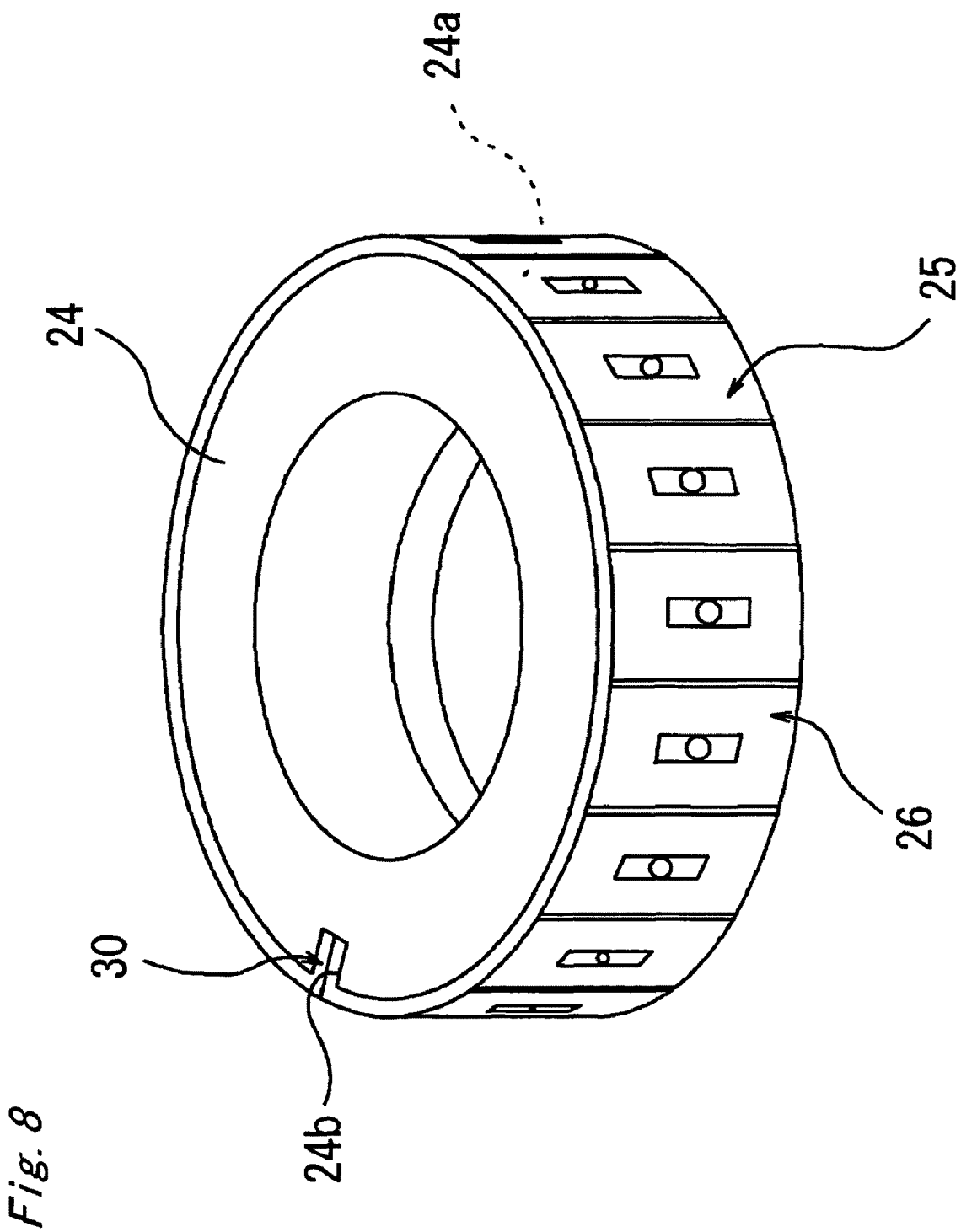
FIG. 8 is a perspective view of a relevant part of a spindle motor according to a second embodiment of the present invention.
Figure 9:
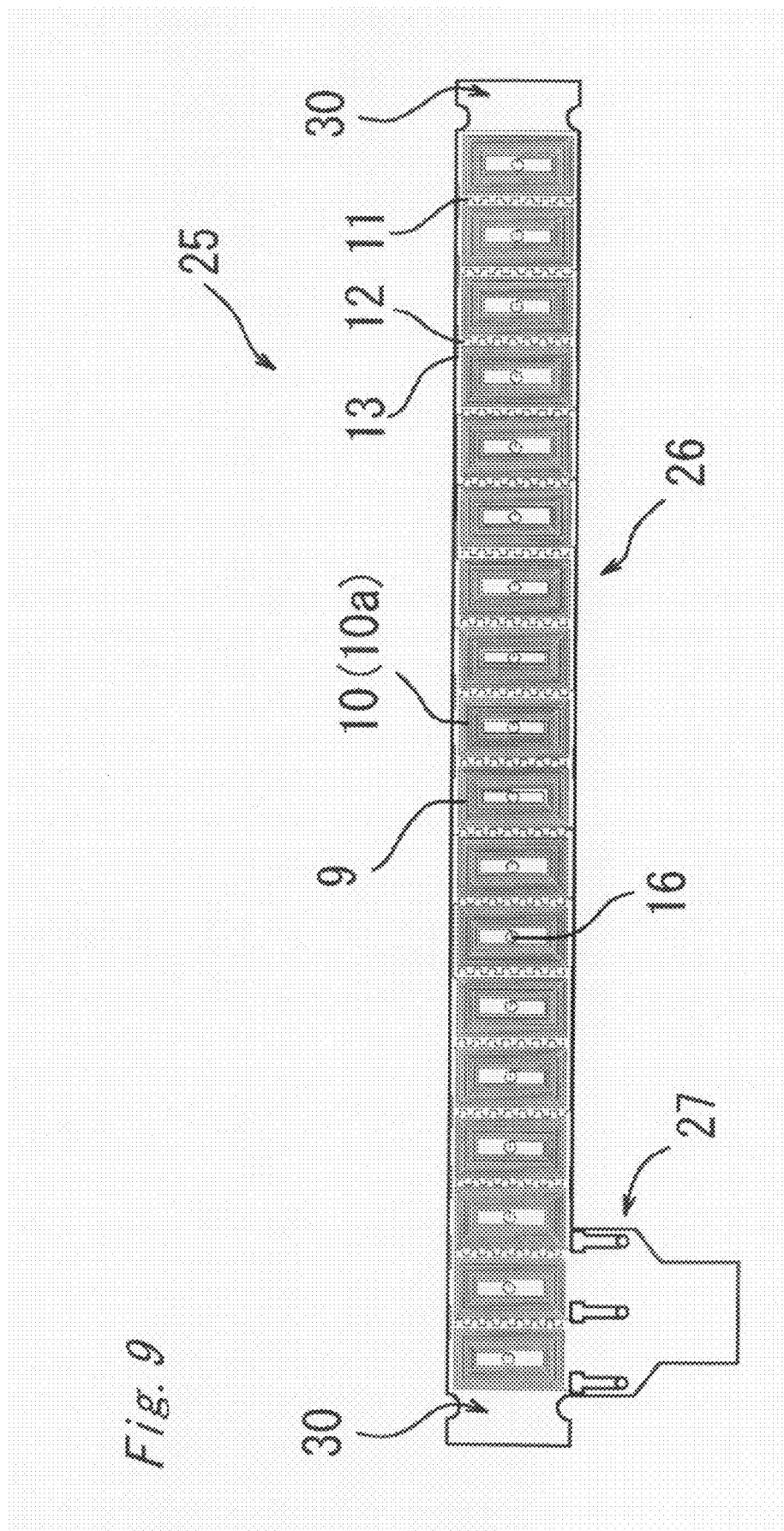
FIG. 9 is a developing plan view of a sheet-like coil for the spindle motor according to the second embodiment.

A second embodiment of the present invention will be described with reference to FIGS. 8 and 9. FIG. 8 shows a sheet-like coil (FP coil) 25 fixedly attached to an outer circumferential surface 24a of a stator yoke 24. FIG. 9 shows the sheet-like coil 25 developed and viewed from the front side. A spindle motor according to the second embodiment differs from the spindle motor 1 according to the first embodiment in the structure of the stator yoke 24 and the sheet-like coil 25.

Specifically, referring to FIG. 8, the stator yoke 24 includes a slit 24b formed at the outer circumferential surface 24a so as to axially extend all the way through. The slit 24b is so configured (with respect to a width and a depth) as to allow fold portions 30 (to be described later) of the sheet-like coil 25 to be engaged or inserted therein.

On the other hand, the sheet-like coil 25 includes a body portion 26 having a strip-shape, a terminal 27 (not shown in FIG. 8) extending from one end portion of the body portion 26, and the aforementioned fold portions 30 shaped substantially rectangular and integrally extending respectively from both circumferential ends of the body portion 26. The body portion 26 and the terminal 27 are structured substantially identically with the body portion 6 and the terminal 7 of the first embodiment, and the description thereof is omitted.

Each of the fold portions 30 is constituted only by a core sheet thus not including a thick film conductor 9, and has recesses at both axial ends of the body portion 26 so as to be easily folded. And, the sheet-like coil 25 is attached to the stator yoke 24 such that the body portion 26 is fixed to the outer circumferential surface 24a of the stator yoke 24 by an adhesive agent with the fold portions 30 engaged or inserted (sandwiched) in the slit 24b.

In the spindle motor incorporating the stator yoke 24 and the sheet-like coil 25 structured as described above, the advantageous effects available in the first embodiment can be achieved similarly. In addition, in the present embodiment, since the fold portions 30 of the sheet-like coil 25 are engaged or inserted (sandwiched) in the slit 24b formed at the outer circumferential surface 24a of the stator yoke 24, the ends of the sheet-like coil 25 can be prevented from springing back, which happens often when the sheet-like coil 25 is stiff as a whole. Moreover, the sheet-like coil 25 easily can be attached tightly to the outer circumferential surface 24a of the stator yoke 24.

Figure 10:
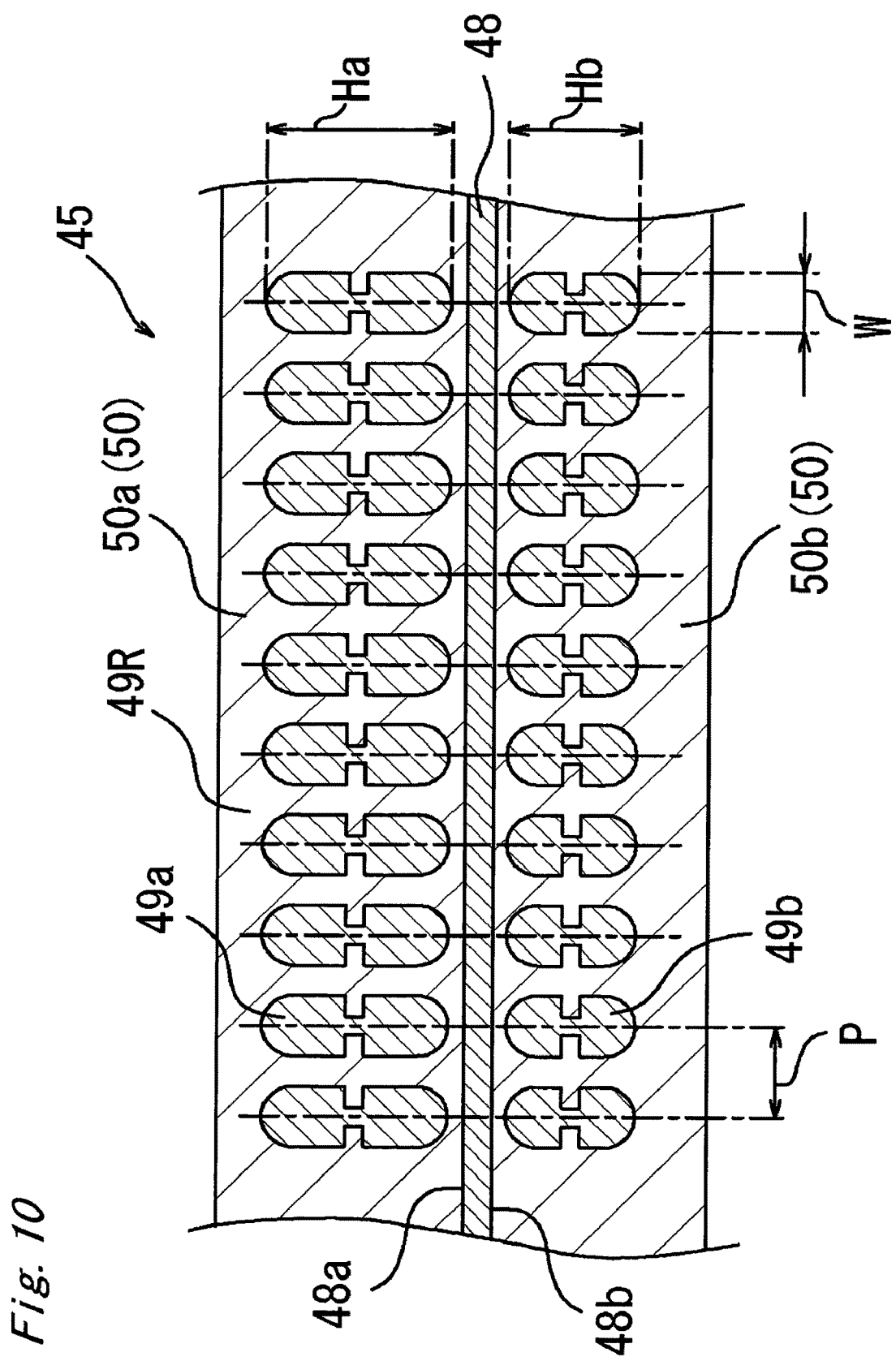
FIG. 10 is an enlarged view of a part of a thickness cross section of a sheet-like coil for a spindle motor according to a third embodiment of the present invention.

A third embodiment of the present invention will be described with reference to FIG. 10. FIG. 10 shows an enlarged view of a profile cross section of a part of a sheet-like coil 45 (an individual coil 50). A spindle motor according to the third embodiment differs from the spindle motor 1 according to the first embodiment in aspect ratio between a thick film conductor 49a and a thick film conductor 49b formed at a front surface 48a and a rear surface 48b of a core sheet 48, respectively.

In the sheet-like coil 5 of the first embodiment, as described above, the turn segment number (the turn number of the individual coil 10), the pitch P and the aspect ratio (height H/width W) of the thick film conductor 9 are set substantially identical between the front individual coil 10a and the rear individual coil 10b. On the other hand, in the third embodiment, the aspect ratio of a thick film conductor 49b (hereinafter referred to as rear thick film conductor 49b) constituting a rear individual coil 50b is set smaller than the aspect ratio of a thick film conductor 49a (hereinafter referred to as front thick film conductor 49a) constituting a front individual coil 50a, as shown in FIG. 10. Specifically, the front thick film conductor 49a and the rear thick film conductor 49b are set to have substantially the same width, and the turn segment number and the pitch P of the front thick film conductor 49a are set identical (substantially identical) with the turn segment number and the pitch P of the rear thick film conductor 49b, while a height Hb of the rear thick film 49b is set smaller than a height Ha of the front thick film conductor 49a.

In the spindle motor incorporating the sheet-like coil 45 constituted as described above, the advantageous effects available in the first embodiment can be achieved similarly. In addition, since the height Hb of the rear thick film conductor 49b at the rear individual coil 50b is set smaller than the height Ha of the front thick film conductor 49a at the front individual coil 50a, the sheet-like coil 45 is adapted to be compressed readily at the side of the rear surface 48b compared with at the side of the front surface 48a and therefore can be easily rolled up in a good shape. Accordingly, the sheet-like coil 45 can be further surely attached tightly to the outer circumferential surface 4a of the stator yoke 4.

Figure 11:
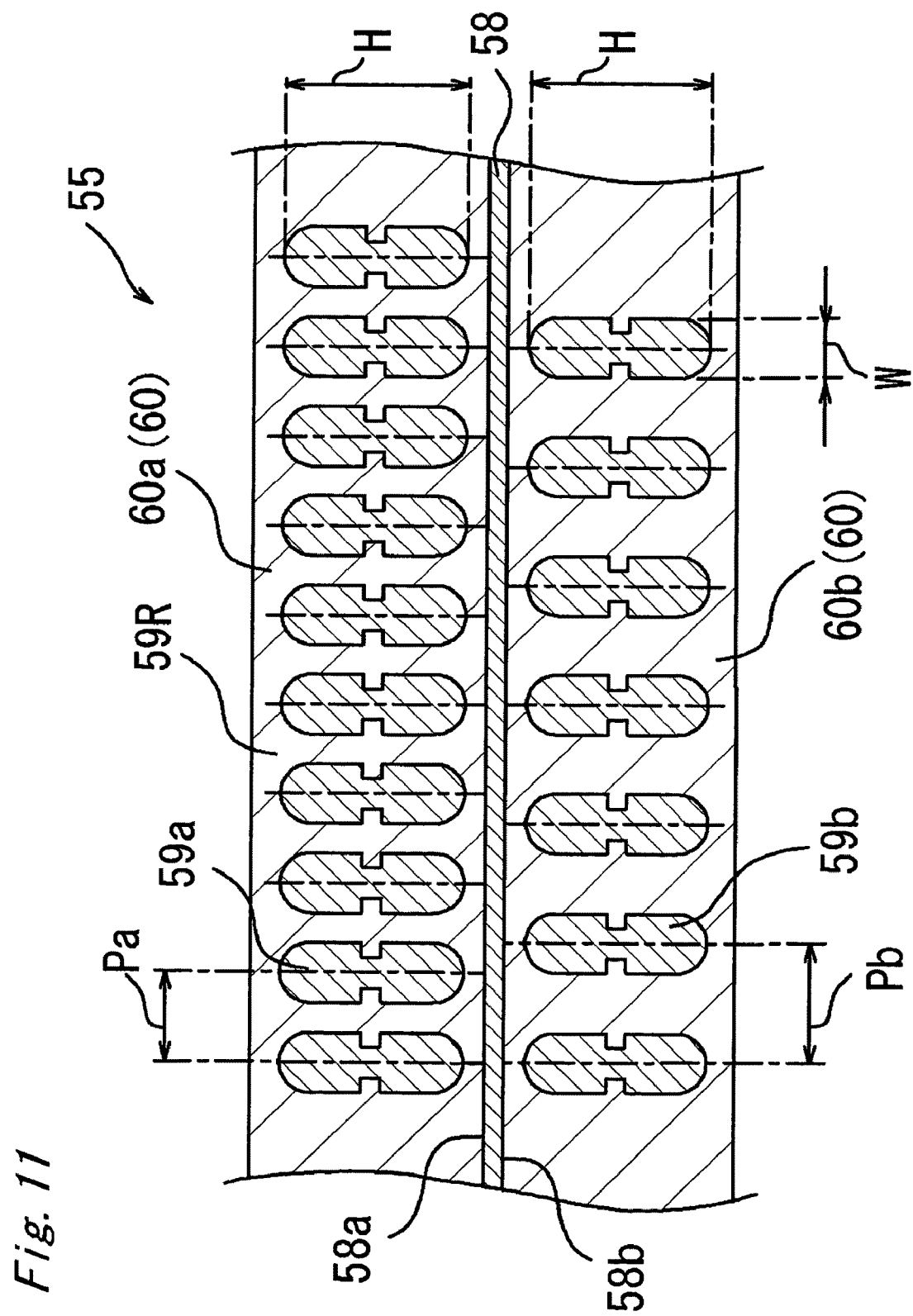
FIG. 11 is an enlarged view of a part of a thickness cross section of a modification example of the sheet-like coil for the spindle motor according to the third embodiment.

In the above description, the front thick film conductor 49a and the rear thick film conductor 49b have their respective different aspect ratios, but it may alternatively be structured as shown in FIG. 11 such that the turn segment number of a rear thick film conductor 59b (the turn number of a rear individual coil 60b) is set smaller than the turn segment number of a front thick film conductor 59a (the turn number of a front individual coil 60a). That is to say, it may be constituted that a pitch Pb of the rear thick film conductor 59b constituting the rear individual coil 60b is larger than a pitch Pa of the front thick film conductor 59a constituting the front individual coil 60a. The sheet-like coil 55 structured as described above is also adapted to be compressed more readily at the side of a rear surface 58b than at the side of a front surface 58a, and accordingly can be easily rolled up in a good shape.

In this connection, the front and rear thick film conductors 59a and 59b do not necessarily have to be arranged at regular pitches but arranged at irregular pitches. Also, it may be structured that the aspect ratios of the thick film conductors as well as the turn numbers of the individual coils are different from each other between at the front individual coil and at the rear individual coil. Specifically, the amount of the rear individual coil is set smaller than the amount of the front individual coil. Moreover, the sheet-like coils 45 and 55 of the present embodiment may be applied to the second embodiment. In the present embodiment, it is preferred to provide the axial wiring lines 11 and 14, the dummy axial wiring lines 12 and 15, and the dummy circumferential wiring line 13, but which is not essential.

The exemplary embodiments of the present invention have been illustrated as above, but the present invention is not limited to the specific embodiments described, and various modifications and combinations of the illustrative embodiments are possible.

Figure 12:
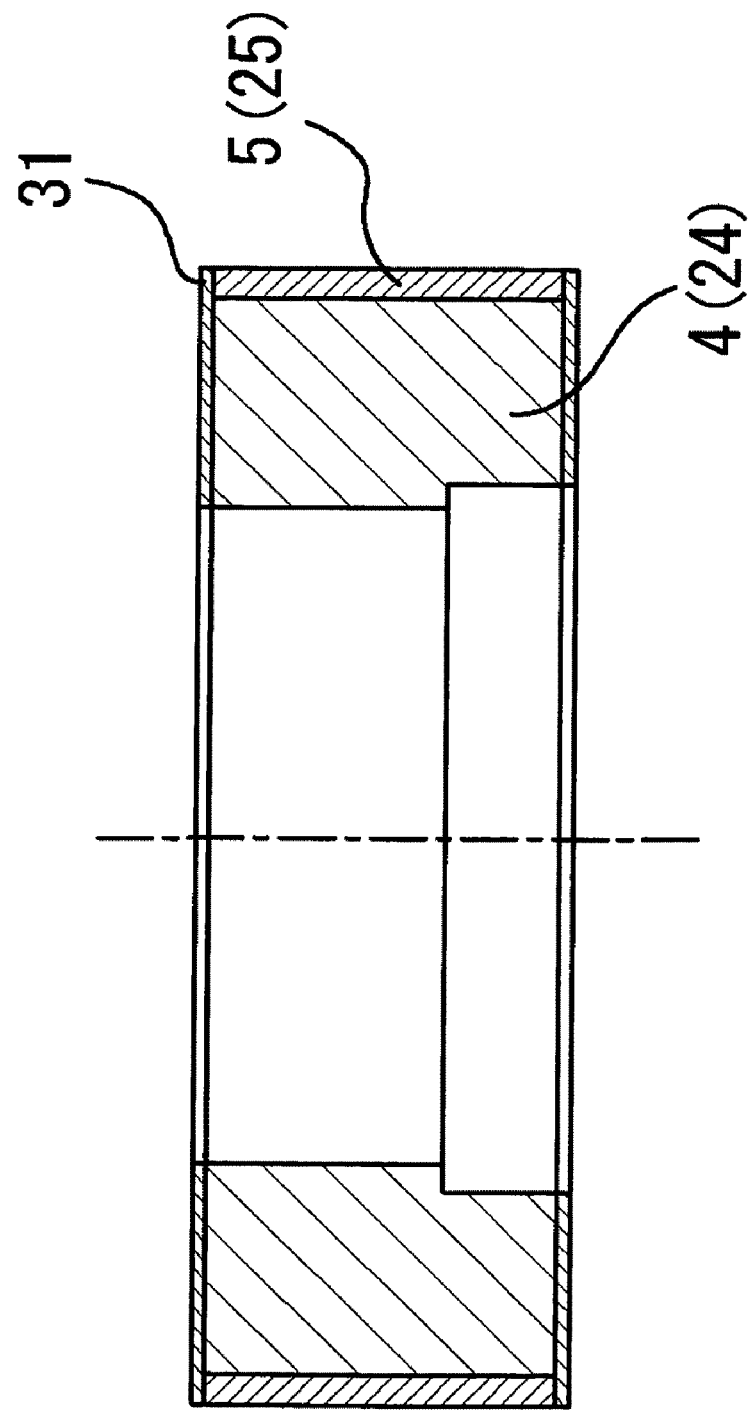
FIG. 12 is an axial cross sectional view of a relevant part of a spindle motor according to another embodiment of the present invention.
Figure 13:
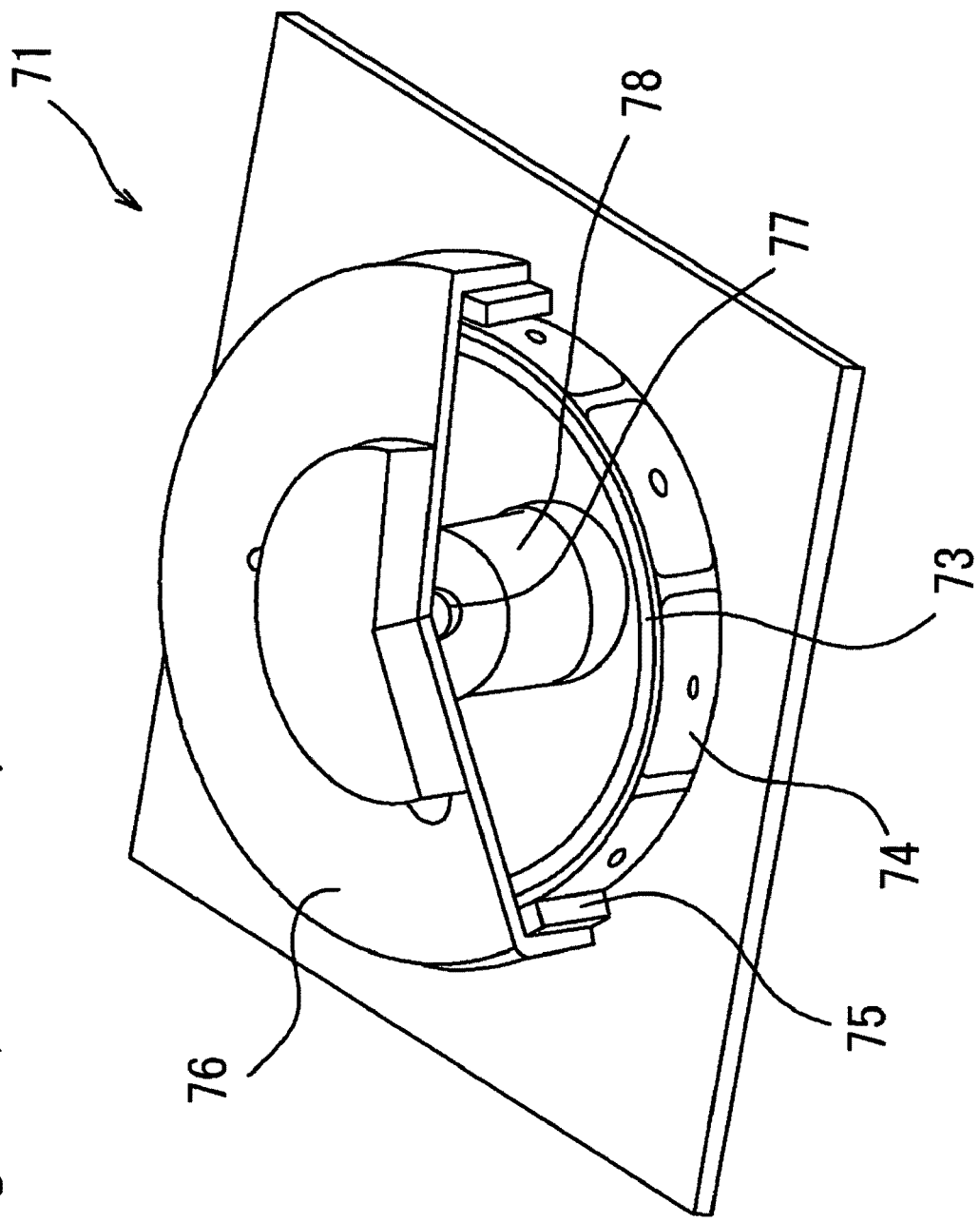
FIG. 13 is a perspective view of a conventional spindle motor, partly cut away.
Figure 14A:
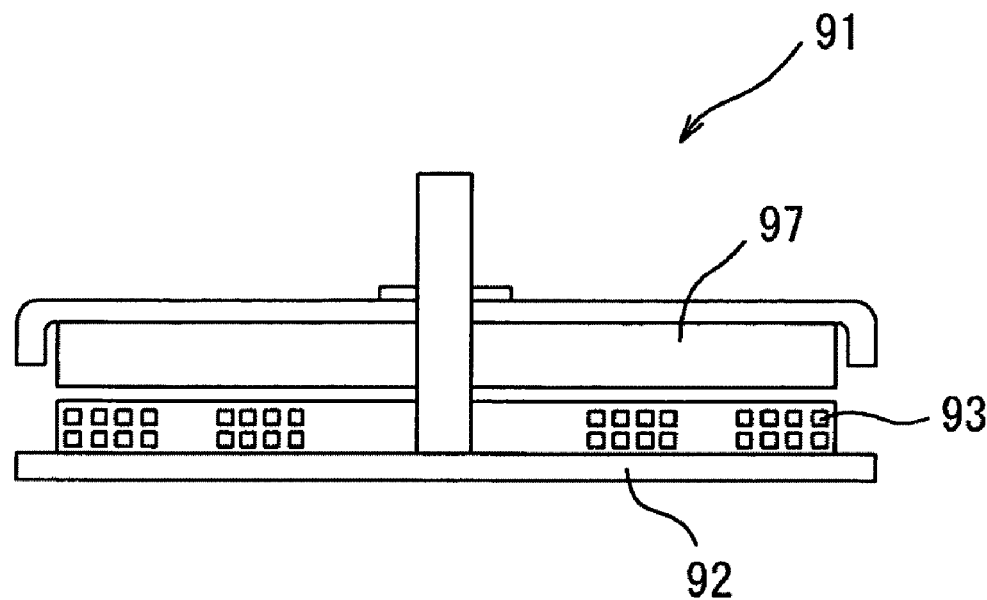
FIG. 14A is a schematic axial cross sectional view of another conventional spindle motor.
Figure 14B:
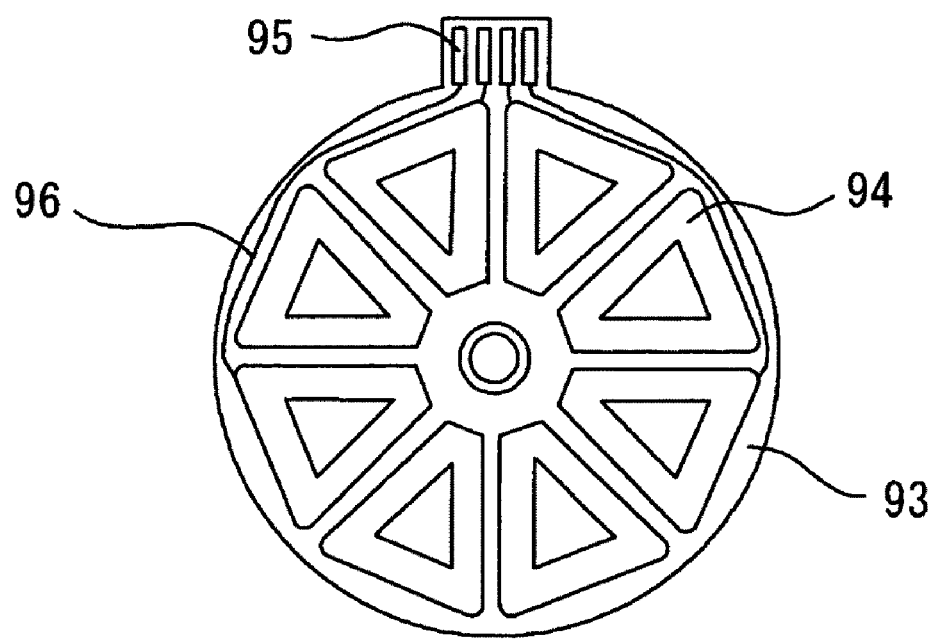
FIG. 14B is a plan view of a fine pattern coil of the spindle motor.

For example, after the sheet-like coil 5/25/45/55 is attached to the outer circumferential surface 4a/24a of the stator yoke 4/24, a thin film (for example, $SiO_2$, or $AL_2O_3$) 31 may be formed by a known method such as vapor deposition and sputtering to integrally cover each of the both axial end surfaces of the sheet-like coil 5/25/45/55 and the stator yoke 4/24 as shown in FIG. 12. The sheet-like coil 5/25/45/55 is cut to a predetermined width, and dusts are caused to come from the cut surface. Under this circumstance, if the spindle motor 1 is mounted in a magnetic disk apparatus with the cut surface of the sheet-like coil 5/25/45/55 exposed, the cleaning level in the magnetic disk apparatus may be deteriorated.

So, for the purpose of preventing deterioration of the cleaning level in the magnetic disk apparatus, the thin film 31 is coated at least on each of the both axial end surfaces of the sheet-like coil 5/25/45/55 after the sheet-like coil 5/25/45/55 is fixedly attached to the outer circumferential surface 4a/24a of the stator yoke 4/24 to thereby prevent dusts-from coming from the cut surface. In this connection, the thin film 31 may be formed to further cover the outer circumferential surface of the sheet-like coil 5/25/45/55 while covering at least the both axial ends of the sheet-like coil 5/25/45/55 is effective in reducing dusts and gases from coming from the cut surface.

Also, in the embodiments described above, the sheet-like coil 5/25 is structured such that the dummy circumferential wiring line 13 is arranged at every region where the circumferential wiring line 13b is not arranged. However, the dummy axial wiring line 13 does not necessarily have to be arranged at every region but may be properly formed and arranged appropriately as needed.

Also, in the embodiments described above, the sheet-like coil 5/25/45/55 is described as having a double-layer structure, but the present invention is not limited to such a structure. For example, the sheet-like coil 5/25/45/55 may have a single-layer structure or a three or more-layer structure. When the sheet-like coil 5/25/24/55 has a two or more-layer structure, the axial wiring lines 11, 14, the dummy axial wiring lines 12, 15, and the dummy circumferential wiring line 13 do not necessarily have to be arranged at each of all layers but may be arranged only at at least one layer, which contributes to achieving a certain level of effect. Also, the axial wiring lines 11, 14, the dummy axial wiring lines 12, 15, and the dummy circumferential wiring line 13 may be shaped differently from one layer or another.

Also, in the embodiments described above, the fluid dynamic bearing structure 19 functions as a radial bearing and a thrust bearing, but the present invention is not limited to such a bearing structure. For example, the radial bearing may be constituted by a fluid dynamic bearing while the thrust bearing is constituted by a magnetic bearing.

Further, in the embodiments described above, the stator yoke 4/24 is composed of a plurality of steel plates stacked on one another but alternatively may be constituted by a dust core. In this case, the stator yoke 4 24 and the sleeve 22 (a part of the bearing) of the fluid dynamic bearing structure 19 may be integrally formed.

Furthermore, in the embodiments described above, the spindle motor 1 is described as a so-called outer rotor type motor wherein the rotor magnet 17 is rotatably disposed outside the circular cylindrical stator yoke 4/24 so as to oppose the outer circumferential surface 4a/24a of the stator yoke 4/24 with an air gap provided therebetween, but the present invention is not limited in its application to such a motor structure and can be also applied to a so-called inner rotor type spindle motor wherein a rotor magnet is rotatably disposed inside a hollow circular cylindrical stator yoke so as to oppose the inner circumferential surface of the stator yoke with an air gap provided therebetween.

In the inner rotor type spindle motor, the sheet-like coil 5/25/45/55 is disposed to be fixedly attached at the inner circumferential surface (surface opposing the rotor magnet) of the stator yoke. Specifically, the sheet-like coil 5/25/45/55 is arranged such that the front individual coil 10a/50a/60a thereof opposes the stator yoke and is fixedly attached thereto, and the rear individual coil 10b/50b/60b thereof opposes the rotor magnet. Also, the slit, which is disposed at the outer circumferential surface of the stator yoke in the second embodiment, is disposed at the inner circumferential surface of the stator yoke. In this connection, in the inner rotor type spindle motor, the rotor magnet may be attached directly to the bearing so that the bearing can serve also as a retaining member of the rotor magnet.

When the sheet-like coil 5/25/45/55 is fixedly attached to the inner circumferential surface of the stator yoke as described above, the restoring force of the sheet-like coil 5/25/24/55, which is generated when the sheet-like coil 5/25/45/55 is rolled up, is adapted to effectively work to tightly attach the sheet-like coil 5/25/45/55 to the inner circumferential surface of the stator yoke. Thus, the sheet-like coil 5/25/24/55 can be further tightly attached to the stator yoke.

The sheet-like coil 5/25/45/55 is applied to a spindle motor for driving a magnetic disk in the embodiments described above, but the present invention is by no means limited in its application to such a spindle motor but is also applicable to a motor adapted for other use. It is intended that the scope of the invention be defined by the following claims.

What is claimed is:

1. A motor comprising:
    a stator yoke having a cylindrical shape;
    a rotor magnet disposed so as to oppose the stator yoke with an air gap therebetween;
    a bearing structure; and
    a sheet coil disposed on a surface of the stator yoke opposing the rotor magnet, the sheet coil comprising:
        a plurality of individual coils arrayed in a circumferential direction, each of the individual coils having a spiral shape;
        a plurality of patterns made of a same material as the individual coils, one pattern being disposed between each two adjacent individual coils of the plurality of individual coils, wherein each of the patterns comprises a line segment extending in the circumferential direction and a plurality of circumferentially extending line segments disposed in the axial direction.

2. A motor according to claim 1, wherein each of the patterns further comprises a wiring line and a dummy circumferential wiring line extending in the circumferential direction that is arranged to bridge two adjacent individual coils.

3. A motor according to claim 1, wherein at least one of the patterns comprises a dummy wiring line that is not connected electrically to the individual coils.

4. A motor according to claim 1, wherein the sheet coil further comprises:
    a wiring line that extends in the circumferential direction and is disposed along at least one portion of each axial end of the sheet coil; and
    at least one dummy wiring line that is not electrically connected to the individual coils and is disposed at portions of either or both axial end areas of the sheet coil in which the wiring line extending in the circumferential direction is not disposed.

5. A motor according to claim 1, wherein
    the sheet coil comprises circumferential end portions, respectively, at opposite ends of the sheet coil,
    the stator yoke comprises a slit formed in the surface of the stator yoke opposing the rotor magnet, the slit extending in an axial direction, and
    both of the circumferential end portions of the sheet coil are inserted in the slit.

6. A motor according to claim 1, wherein the individual coils are each made of a plurality of thick film conductors radially layered on one another.

7. A motor according to claim 6, wherein an aspect ratio of a thick film conductor of a radially inward layer is smaller than an aspect ratio of a thick film conductor of a radially outward layer.

8. A motor according to claim 6, wherein a number of coil turns of a thick film conductor of a radially inward layer is less than a number of coil turns of a thick film conductor of a radially outward layer.

9. A motor according to claim 1, wherein each of axial end surfaces of the sheet coil is coated with a thin film.

10. A motor according to claim 1, wherein the bearing structure comprises a fluid dynamic pressure bearing.

11. A motor according to claim 1, wherein the bearing structure comprises a radial bearing for supporting a shaft in a radial direction and a thrust bearing for supporting the shaft in a thrust direction, where the radial bearing is a fluid dynamic pressure bearing and the thrust bearing is a magnetic bearing.

12. A motor according to claim 1, wherein the stator yoke and a part of the bearing structure are made of a dust core and are integrated with each other.

13. A motor according to claim 1, wherein the rotor magnet comprises a rare earth sintered magnet with radial magnetization and comprises a plurality of poles arrayed in the circumferential direction.

14. A motor according to claim 1, wherein the motor is a spindle motor.

15. A coil sheet comprising:
    a plurality of individual coils arrayed along a length direction of the coil sheet, each individual coil having a spiral shape; and
    at least one pattern made of a same material as the individual coils, each pattern disposed between two adjacent individual coils of the plurality of individual coils, wherein each pattern comprises a line segment extending in the circumferential direction and a plurality of circumferentially extending line segments disposed in the axial direction.

16. A coil sheet according to claim 15, wherein the individual coils are each made of a plurality of thick film conductors layered on one another in a thickness direction of the coil sheet.

17. A coil sheet according to claim 16, wherein an aspect ratio of a thick film conductor of one layer is different from an aspect ratio of a thick film conductor of another layer.

18. A coil sheet according to claim 16, wherein a number of coil turns of a thick film conductor of one layer is different from a number of coil turns of a thick film conductor of another layer.

* * * * *